United States Patent
Oiwa

(10) Patent No.: US 10,762,711 B2
(45) Date of Patent: Sep. 1, 2020

(54) HEAD-UP DISPLAY SYSTEM

(71) Applicant: TOYOTA JIDOSHA KABUSHIKI KAISHA, Toyota-shi, Aichi-ken (JP)

(72) Inventor: Toshikazu Oiwa, Yokohama (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/037,578

(22) Filed: Jul. 17, 2018

(65) Prior Publication Data
US 2019/0073828 A1 Mar. 7, 2019

(30) Foreign Application Priority Data

Sep. 7, 2017 (JP) ................................. 2017-171981

(51) Int. Cl.
| | | |
|---|---|---|
| G06T 19/00 | (2011.01) | |
| B60K 35/00 | (2006.01) | |
| G06T 19/20 | (2011.01) | |
| G02B 27/01 | (2006.01) | |

(52) U.S. Cl.
CPC ............ G06T 19/006 (2013.01); B60K 35/00 (2013.01); G06T 19/20 (2013.01); B60K 2370/1529 (2019.05); B60K 2370/166 (2019.05); B60K 2370/177 (2019.05); B60K 2370/52 (2019.05); G02B 27/0101 (2013.01); G02B 2027/014 (2013.01); G02B 2027/0141 (2013.01); G06T 2219/2016 (2013.01); G06T 2219/2024 (2013.01)

(58) Field of Classification Search
CPC .................. G06T 19/006; G06T 19/20; G06T 2219/2016; G06T 2219/2024; B60K 35/00; B60K 2370/1529; B60K 2370/177; B60K 2370/166; B60K 2370/52; G02B 27/0101; G02B 2027/014; G02B 2027/0141; G01C 21/3632; G01C 21/365
See application file for complete search history.

(56) References Cited

U.S. PATENT DOCUMENTS

| | | | | |
|---|---|---|---|---|
| 7,940,285 | B2* | 5/2011 | Would | G06F 3/0482 345/629 |
| 9,817,237 | B2* | 11/2017 | Kutomi | G02B 27/01 |
| 2006/0271284 | A1* | 11/2006 | Watanabe | G01C 21/367 701/431 |
| 2011/0052042 | A1* | 3/2011 | Ben Tzvi | G06T 19/006 382/154 |
| 2015/0260534 | A1* | 9/2015 | Shen | G01C 21/34 701/408 |

FOREIGN PATENT DOCUMENTS

JP          2016090344 A          5/2016

* cited by examiner

*Primary Examiner* — Robert J Craddock
(74) *Attorney, Agent, or Firm* — Hunton Andrews Kurth LLP

(57) ABSTRACT

A head-up display system includes: an object generation unit configured to generate an object for supporting driving and adjust a display state of the object in such a manner as to adapt to a place at which driving support is required based on information on the place; and a display control unit configured to display the object on a windshield in such a manner that the object is superimposed on a real space visible across the windshield.

10 Claims, 2 Drawing Sheets

HEAD-UP DISPLAY SYSTEM

INCORPORATION BY REFERENCE

The disclosure of Japanese Patent Application No. 2017-171981 filed on Sep. 7, 2017 including the specification, drawings and abstract is incorporated herein by reference in its entirety.

BACKGROUND

1. Technical Field

The disclosure relates to a head-up display system.

2. Description of Related Art

In Japanese Patent Application Publication No. 2016-90344 (JP 2016-90344 A), there is disclosed a head-up display (an HUD) that displays an arrow for providing guidance on a running route on a windshield of an own vehicle in such a manner that the arrow is superimposed on an intersection visible across the windshield. In this Japanese Patent Application Publication No. 2016-90344 (JP 2016-90344 A), a length of a shaft part of an arrow for providing guidance on entrance into the intersection is determined based on a distance from a current position of the own vehicle to the intersection, a length of a shaft part of an arrow for providing guidance on a traveling direction after making a turn at the intersection is determined based on a width of a road on which the own vehicle currently runs, and the arrow for providing guidance on the running route is created based on the determined lengths.

SUMMARY

In Japanese Patent Application Publication No. 2016-90344 (JP 2016-90344 A), the arrow can be displayed without causing a feeling of strangeness in the case where a flat road continues to the intersection where guidance is provided. However, in the case where the own vehicle runs on a flat road and then encounters an uphill or downhill slope before reaching the intersection, the tip of the arrow seems to penetrate the uphill slope or point to the sky. For this reason, a driver develops a feeling of strangeness.

Thus, the disclosure provides a head-up display system capable of alleviating the feeling of strangeness developed by the driver.

A head-up display system according to a first aspect of the disclosure includes: an object generation unit configured to generate an object for supporting driving and adjust a display state of the object in such a manner as to adapt to a place at which driving support is required based on information on the place; and a display control unit configured to display the object on a windshield in such a manner that the object is superimposed on a real space visible across the windshield.

A head-up display system according to a second aspect of the disclosure includes: a processor configured to: generate an object for supporting driving; adjust a display state of the object in such a manner as to adapt to a place at which driving support is required based on information on the place; and display the object on a windshield, by using a projector, in such a manner that the object is superimposed on a real space visible across the windshield.

In the above aspect, the object generation unit may be configured to transform the object based on a direction of a second running axis that is assumed at the place when a first running axis extending along a running direction of an own vehicle is different from the second running axis.

In the above aspect, the object generation unit may be configured to: generate an arrow-shaped figure as the object; transform the arrow-shaped figure when a distance between a position of the own vehicle and an intersection is equal to or less than a predetermined distance, guidance on a right or left turn as driving support being required at the intersection; and blur a contour of a leading end side of the arrow-shaped figure more than a contour of a terminal end side of the arrow-shaped figure when a downhill slope exists between the position of the own vehicle and the intersection.

In the above aspect, the object generation unit may be configured to: generate an arrow-shaped figure as the object; transform the arrow-shaped figure when a distance between a position of the own vehicle and an intersection is equal to or less than a predetermined distance, guidance on a right or left turn as driving support being required at the intersection; and blur a contour of a terminal end side of the arrow-shaped figure more than a contour of a leading end side of the arrow-shaped figure when an uphill slope exists between the position of the own vehicle and the intersection.

In the above aspect, the object generation unit may be configured to: generate an arrow-shaped figure which is a three-dimensional image as the object; transform the arrow-shaped figure when a distance between a position of the own vehicle and an intersection is equal to or less than a predetermined distance, guidance on a right or left turn as driving support being required; and transform the arrow-shaped figure such that a thickness of a terminal end side of the arrow-shaped figure is greater than a thickness of a leading end side of the arrow-shaped figure when a downhill slope exists between the position of the own vehicle and the intersection.

In the above aspect, the object generation unit may be configured to: generate an arrow-shaped figure which is a three-dimensional image as the object; transform the arrow-shaped figure when a distance between a position of the own vehicle and an intersection is equal to or less than a predetermined distance, guidance on a right or left turn as driving support being required; and transform the arrow-shaped figure such that a thickness of a leading end side of the arrow-shaped figure is greater than a thickness of a terminal end side of the arrow-shaped figure when an uphill slope exists between the position of the own vehicle and the intersection.

In the above aspect, the head-up display system may further include a geographical information acquisition unit configured to acquire geographical information on a running route to a destination. The object generation unit may be configured to: acquire a first running axis and a second running axis based on the geographical information when a distance between the place and an own vehicle is equal to or less than a predetermined distance, the own vehicle running along the first running axis, and the own vehicle being assumed to run along the second axis at the place; and transform the object based on the first running axis and the second running axis when the first running axis and the second running axis are different from each other.

In the above aspect, the object generation unit may be configured to: generate an arrow-shaped figure as the object; and blur a contour of a leading end side of the arrow-shaped figure more than a contour of a terminal end side of the arrow-shaped figure when a downhill slope exists between the own vehicle and the place.

In the above aspect, the object generation unit may be configured to: generate an arrow-shaped figure as the object; and blur a contour of a terminal end side of the arrow-shaped figure more than a contour of a leading end side of the arrow-shaped figure when an uphill slope exists between the own vehicle and the place.

In the above aspect, the object generation unit may be configured to: generate an arrow-shaped figure which is a three-dimensional image as the object; and transform the arrow-shaped figure such that a thickness of a terminal end side of the arrow-shaped figure is greater than a thickness of a leading end side of the arrow-shaped figure when a downhill slope exists between the own vehicle and the place.

In the above aspect, the object generation unit may be configured to: generate an arrow-shaped figure which is a three-dimensional image as the object; and transform the arrow-shaped figure such that a thickness of a leading end side of the arrow-shaped figure is greater than a thickness of a terminal end side of the arrow-shaped figure when an uphill slope exists between the own vehicle and the place.

According to the above aspects, the head-up display system capable of alleviating the feeling of strangeness developed by the driver can be provided.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

The preferred embodiment of the disclosure will be described with reference to the accompanying drawings. Incidentally, like or equivalent elements are denoted by like reference symbols in the respective drawings. A head-up display system 1 according to the embodiment of the disclosure is a system that is mounted in, for example, a vehicle to support a driver as a user in driving.

Figure 1:
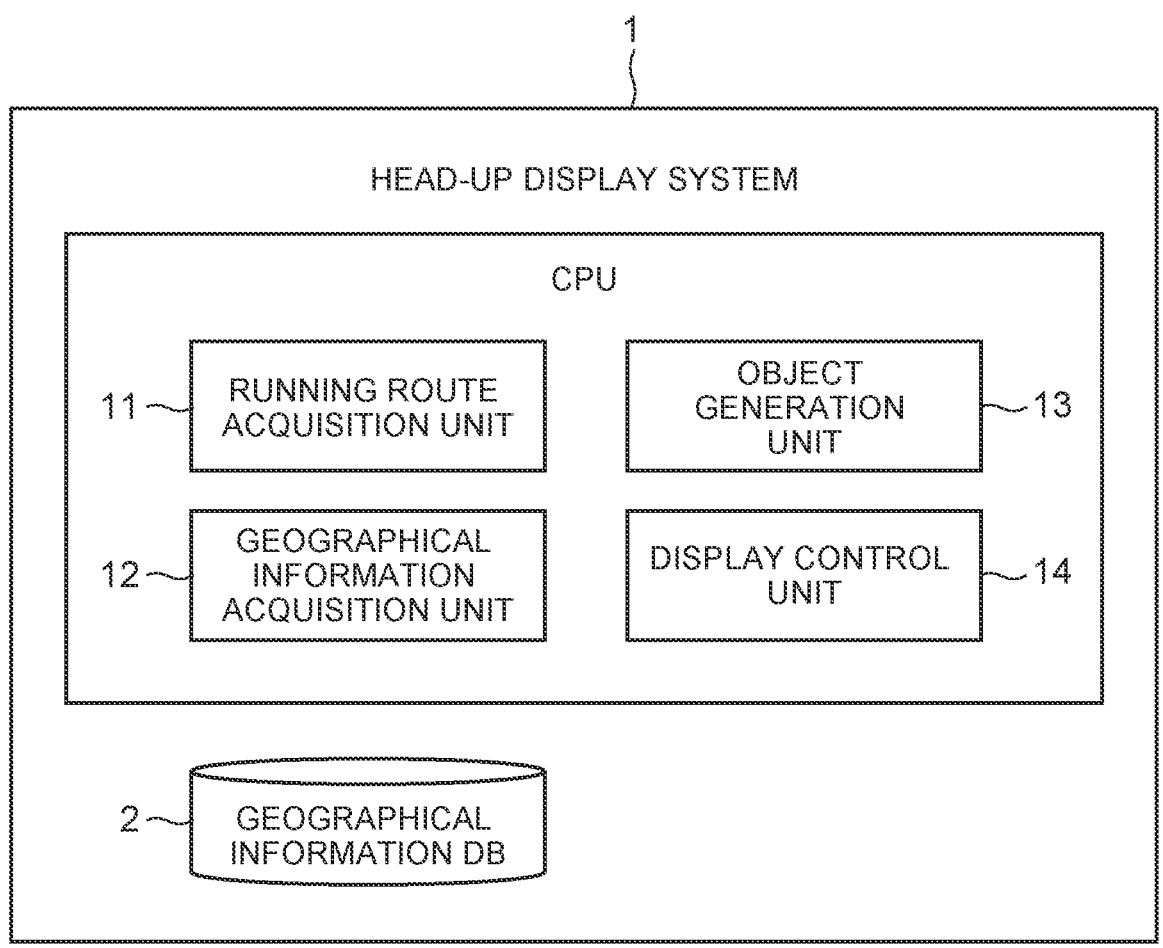
FIG. 1 is a view exemplifying the functional configuration of a head-up display system according to the embodiment of the disclosure.

Referring to FIG. 1, the functional configuration of the head-up display system 1 according to the embodiment of the disclosure will be described. The head-up display system 1 has, for example, a running route acquisition unit 11, a geographical information acquisition unit 12, an object generation unit 13, and a display control unit 14. Incidentally, the head-up display system 1 is not limited to these functions. If necessary, any functions can be added appropriately.

The head-up display system 1 is configured, as its physical configuration, to be equipped with, for example, a control unit including a central processing unit (a CPU) and a memory, an operation portion, a display, a projector, a speaker, a communication device and the like. The head-up display system 1 may be configured as a single device or a plurality of separate devices. The respective functions of the running route acquisition unit 11, the geographical information acquisition unit 12, the object generation unit 13, and the display control unit 14 are realized through the execution of a predetermined program stored in the memory by the CPU. The respective functions will be described hereinafter.

The running route acquisition unit 11 acquires, based on a destination designated by the driver, a running route from a current position to the destination. The current position can be acquired through the use of, for example, a global positioning system (GPS) receiver or the like that is mounted in the vehicle.

The running route can be acquired as follows. For example, a navigation function is made available in the head-up display system 1, and the running route is acquired by being searched with the aid of the navigation function. Besides, the running route may be acquired by transmitting the destination to an external server and receiving the searched running route from the external server.

The geographical information acquisition unit 12 acquires geographical information required for route guidance, such as map data, intersection data and the like, from a geographical information database (DB) 2 based on the acquired running route. The geographical information DB 2 stores, for example, map data, intersection data, link data, node data and the like as geographical information. The intersection data are data on intersections, such as the positions, shapes and the like thereof. The link data are data on straight parts (links) of roads. The node data are data on parts (nodes) where road states such as the gradients, curves and the like of roads change.

The geographical information may be stored in the head-up display system 1 or managed outside the head-up display system 1. Besides, the geographical information may be divided into a plurality of pieces of information and separately managed inside and outside the head-up display system 1. Besides, information obtained from a camera mounted in the vehicle and various sensors such as a light detection and ranging (LiDAR) sensor and the like may be included in the geographical information and utilized.

The object generation unit 13 generates an object for supporting driving. The object for supporting driving includes, for example, an arrow for providing guidance on a right or left turn at an intersection, a mark for attracting attention to the presence of a bicycle, a pedestrian, an obstacle or the like on the running route, or the like. The object may be a three-dimensional image.

The object generation unit 13 adjusts the display state of the object in such a manner as to adapt to a place requiring driving support, based on information on the place. The place requiring driving support is, for example, an intersection where guidance on a right or left turn is provided, a place where there is a bicycle, a pedestrian, an obstacle or the like, or the like. The display state of the object includes, for example, the shape, color, degree of transparency or the like of the object.

For example, the object generation unit 13 transforms the object based on a direction of a running axis extending along a running direction of an own vehicle when this running axis is different from a running axis that is assumed at a place requiring driving support, and adjusts the display state of the object. The running axis may include a component in a gravitational direction and a component in a direction perpendicular to the gravitational direction. Concrete examples (1) and (2) of transforming the object will be described hereinafter.

(1) The object generation unit 13 transforms the object by blurring the contour of a leading end side of an arrow-shaped figure as the object more than the contour of a terminal end side of the arrow-shaped figure when there is a downhill slope between a current position of the own vehicle and an intersection located at a predetermined distance ahead thereof and guidance on a right or left turn at the intersection is to be provided as driving support. On the other hand, the object generation unit 13 transforms the object by blurring the contour of the terminal end side of the arrow-shaped figure more than the contour of the leading end side of the arrow-shaped figure when there is an uphill slope between the current position of the own vehicle and the intersection. In this case, the difference in blurring degree may be increased as the gradient of the slope increases. Alternatively, the entire arrow-shaped figure may be used and gradually blurred with gradation. The leading end may be the end of the arrow-shaped figure on an arrow head side of the arrow-shaped figure. The terminal end may be the end of the arrow-shaped figure on a shaft side of the arrow-shaped figure.

The aforementioned predetermined distance may be set to, for example, 30 to 50 meters. By setting the predetermined distance to 30 to 50 meters, guidance on a right or left turn can be provided earlier than in the case of general navigation. Thus, a remarkable effect of making it possible to reduce the number of sources of anxiety about automatic driving is obtained, for example, in the case where the head-up display system 1 is mounted in an automatically driven vehicle.

(2) The object generation unit 13 transforms the object by making the thickness of the terminal end side of the arrow-shaped figure as the object larger than the thickness of the leading end side of the arrow-shaped figure when there is a downhill slope between the current position of the own vehicle and the intersection located at the predetermined distance ahead thereof in the case where driving support information is information for providing guidance on a right or left turn at the intersection. On the other hand, the object generation unit 13 transforms the object by making the thickness of the leading end side of the arrow-shaped figure larger than the thickness of the terminal end side of the arrow-shaped figure when there is an uphill slope between the current position of the own vehicle and the intersection. In this case, the difference in thickness may be increased as the gradient of the slope increases. Alternatively, the entire arrow-shaped figure may be used and gradually changed in thickness.

The display control unit 14 displays the generated object on a windshield in such a manner that the displayed object is superimposed on a real space visible across the windshield.

In concrete terms, the display control unit 14 has the function of a head-up display (an HUD), and displays the object on the windshield while changing the focal length in accordance with the distance or the like to the place for superimposition. The display control unit 14 may project the object onto the windshield through the use of, for example, a projector, or display the object on a transparent screen provided on the windshield.

Figure 2:
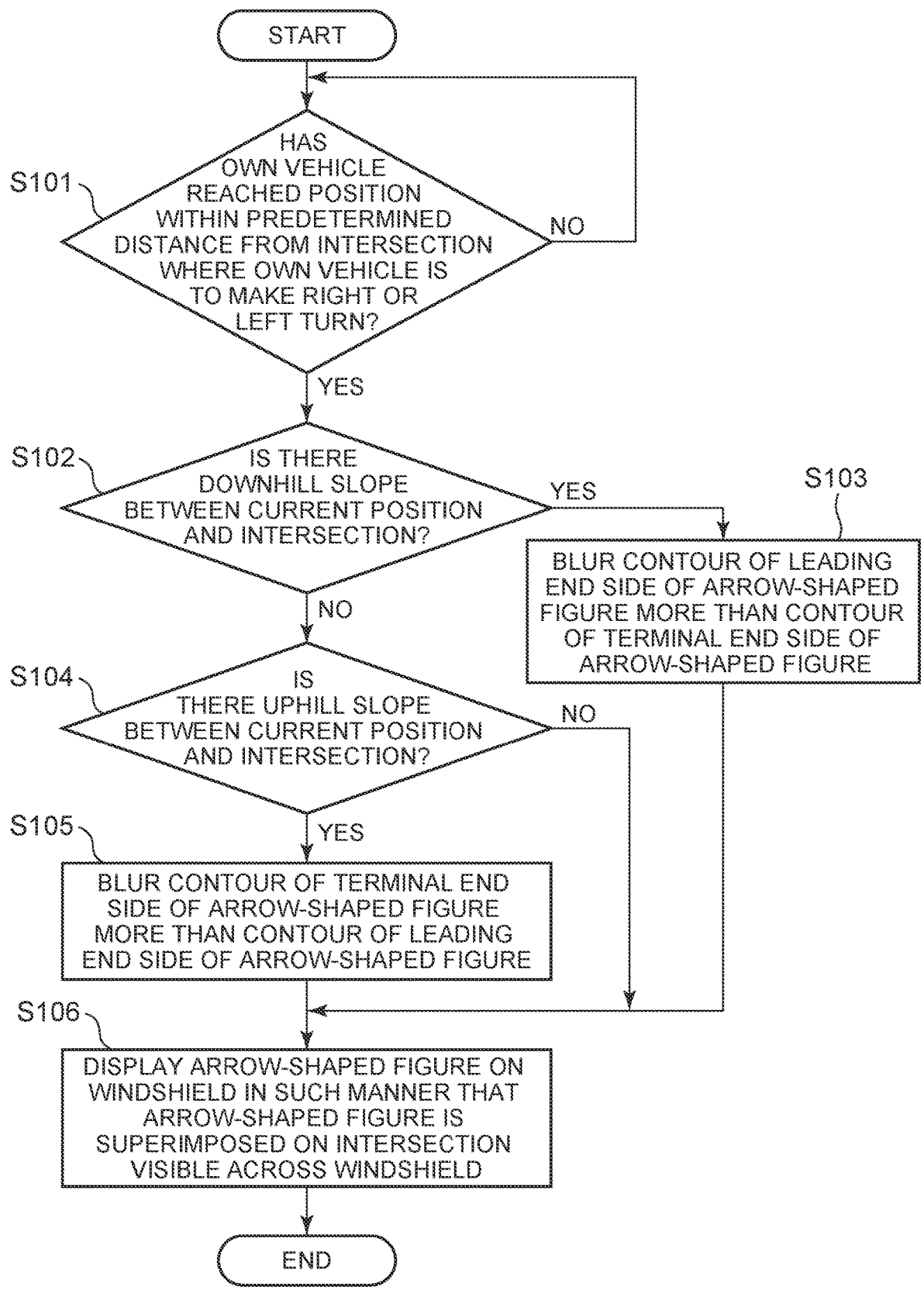
FIG. 2 is a flowchart for illustrating the operation of the head-up display system according to the embodiment of the disclosure.

Next, an exemplary operation of the head-up display system 1 according to the embodiment of the disclosure will be described with reference to FIG. 2. In this case, a mode of blurring the contour of the arrow-shaped figure in accordance with the gradient of the slope to the intersection in providing guidance on a right or left turn at the intersection will be described as an example.

First of all, the object generation unit 13 determines whether or not the own vehicle has reached a position within a predetermined distance from an intersection where the own vehicle is to make a right or left turn (step S101). If the result of this determination is NO (NO in step S101), the determination in step S101 is repeated until the result thereof becomes YES.

If it is determined in the determination in the aforementioned step S101 that the own vehicle has reached the position within the predetermined distance from the intersection (YES in step S101), the object generation unit 13 determines whether or not there is a downhill slope between the current position of the own vehicle and the intersection (step S102). If the result of this determination is YES (YES in step S102), the object generation unit 13 blurs the contour of the leading end side of the arrow-shaped figure more than the contour of the terminal end side of the arrow-shaped figure (step S103). Then, the process is shifted to step S106, which will be described later.

If it is determined in the determination in the aforementioned step S102 that there is no downhill slope between the current position and the intersection (NO in step S102), the object generation unit 13 determines whether or not there is an uphill slope between the current position of the own vehicle and the intersection (step S104). If the result of this determination is NO (NO in step S102), the process is shifted to step S106, which will be described later.

If it is determined in the determination in the aforementioned step S104 that there is an uphill slope between the current position and the intersection (YES in step S104), the object generation unit 13 blurs the contour of the terminal end side of the arrow-shaped figure more than the contour of the leading end side of the arrow-shaped figure (step S105).

Subsequently, the display control unit 14 displays the arrow-shaped figure on the windshield in such a manner that the arrow-shaped figure is superimposed on a real space visible across the windshield (step S106), and then ends the present operation. Incidentally, when the process is shifted to the present step S106 on the ground that the result of the determination in the aforementioned step S104 is NO, the display control unit 14 displays the arrow-shaped figure with the contour thereof unadjusted.

As described previously, the head-up display system 1 according to the embodiment of the disclosure makes it possible to generate the arrow-shaped figure for providing guidance on a right or left turn at the intersection, display the generated arrow-shaped figure on the windshield in such a manner that the arrow-shaped figure is superimposed on the real space visible across the windshield, and transform the arrow-shaped figure in such a manner that the display state of the arrow-shaped figure adapts to the gradient of the slope to the intersection, based on information on the gradient, when the vehicle approaches the intersection located at the predetermined distance ahead thereof.

Therefore, the head-up display system 1 according to the embodiment of the disclosure makes it possible to alleviate the feeling of strangeness developed by the driver.

Modification Example

Incidentally, the disclosure is not limited to the foregoing embodiment thereof, but can be carried out in various other forms within such a range as not to depart from the gist of the disclosure. Therefore, the aforementioned embodiment of the disclosure is nothing but an exemplification in every respect, and is not interpreted in a restrictive manner. For example, the foregoing respective processing steps can be arbitrarily changed in sequence within such a range that no contradiction is caused among the processing contents, or can be carried out in parallel.

Besides, in the foregoing embodiment of the disclosure, the display state of the arrow-shaped figure is adjusted in accordance with the gradient of the slope to the intersection, but the disclosure is not limited thereto. For example, the display state of the arrow-shaped figure may be adjusted in accordance with the speed of the own vehicle or the degree of curvature of a curve. In concrete terms, the bending amount of the arrow-shaped figure may be increased, the size of the leading end side of the arrow-shaped figure may be increased, or the conspicuousness of the color of the arrow-shaped figure may be increased as the speed increases or as the degree of curvature of the curve increases.

Besides, the object generation unit may acquire a running axis of the own vehicle as a direction in which the own vehicle runs and an assumed running axis as a direction in which the own vehicle is assumed to run at a place requiring driving support, from geographical information acquired by the geographical information acquisition unit, such as map data, intersection data and the like, in adjusting the display state of the object. In addition, the object generation unit may determine whether or not there is an uphill slope and whether or not there is a downhill slope between the current position of the own vehicle and the place requiring driving support, based on the acquired running axis along which the own vehicle runs and the acquired assumed running axis.

In the case where the running axis extending along the running direction of the own vehicle is different from the assumed running axis, when the assumed running axis is inclined upward from the running axis of the own vehicle in a vertical direction of the vehicle, it may be determined that the assumed running axis has an upward gradient. Besides, when the assumed running axis is directed downward from the running axis of the own vehicle in the vertical direction of the vehicle, it may be determined that the assumed running axis has a downward gradient. In this case, the vertical direction of the vehicle may be a direction perpendicular to the running axis of the own vehicle.

What is claimed is:

1. A head-up display system comprising:
   a processor for executing programs stored in memory, wherein: execution of the programs realizes an object generation unit and a display control unit;
   the object generation unit configured to
      generate an arrow-shaped figure as an object for supporting driving;
      adjust at least one of a degree of blur of the arrow-shaped figure or a thickness of the arrow-shaped figure in such a manner as to adapt to a place at which driving support is required based on information on the place;
      transform the object based on a direction of a second running axis that is assumed at the place when a first running axis extending along a running direction of a vehicle is different from the second running axis;
      generate an arrow-shaped figure as the object;
      transform the arrow-shaped figure when a distance between a position of the vehicle and an intersection is equal to or less than a predetermined distance, guidance on a right or left turn as driving support being required at the intersection; and
      blur a contour of a leading end side of the arrow-shaped figure more than a contour of a terminal end side of the arrow-shaped figure when a downhill slope exists between the position of the vehicle and the intersection, and
   the display control unit configured to display the object on a windshield in such a manner that the object is superimposed on a real space visible across the windshield.

2. The head-up display system according to claim 1, wherein
   the object generation unit is configured to:
      generate an arrow-shaped figure as the object;
      transform the arrow-shaped figure when a distance between a position of the vehicle and an intersection is equal to or less than a predetermined distance, guidance on a right or left turn as driving support being required at the intersection; and
      blur a contour of a terminal end side of the arrow-shaped figure more than a contour of a leading end side of the arrow-shaped figure when an uphill slope exists between the position of the vehicle and the intersection.

3. The head-up display system according to claim 1, wherein
   the object generation unit is configured to:
      generate an arrow-shaped figure which is a three-dimensional image as the object;
      transform the arrow-shaped figure when a distance between a position of the vehicle and an intersection is equal to or less than a predetermined distance, guidance on a right or left turn as driving support being required; and
      transform the arrow-shaped figure such that a thickness of a terminal end side of the arrow-shaped figure is greater than a thickness of a leading end side of the arrow-shaped figure when a downhill slope exists between the position of the vehicle and the intersection.

4. The head-up display system according to claim 1, wherein
   the object generation unit is configured to:
      generate an arrow-shaped figure which is a three-dimensional image as the object;
      transform the arrow-shaped figure when a distance between a position of the vehicle and an intersection is equal to or less than a predetermined distance, guidance on a right or left turn as driving support being required; and
      transform the arrow-shaped figure such that a thickness of a leading end side of the arrow-shaped figure is greater than a thickness of a terminal end side of the arrow-shaped figure when an uphill slope exists between the position of the vehicle and the intersection.

5. The head-up display system according to claim 1, wherein execution of the programs further realizes a geographical information acquisition unit configured to acquire geographical information on a running route to a destination, wherein
   the object generation unit is further configured to:
      acquire a first running axis and a second running axis based on the geographical information when a distance between the place and the vehicle is equal to or less than a predetermined distance, the vehicle running along the first running axis, and the vehicle being assumed to run along the second axis at the place; and
      transform the object based on the first running axis and the second running axis when the first running axis and the second running axis are different from each other.

6. The head-up display system according to claim 5, wherein
the object generation unit is configured to:
generate an arrow-shaped figure as the object; and
blur a contour of a leading end side of the arrow-shaped figure more than a contour of a terminal end side of the arrow-shaped figure when a downhill slope exists between the vehicle and the place.

7. The head-up display system according to claim 5, wherein
the object generation unit is configured to:
generate an arrow-shaped figure as the object; and
blur a contour of a terminal end side of the arrow-shaped figure more than a contour of a leading end side of the arrow-shaped figure when an uphill slope exists between the vehicle and the place.

8. The head-up display system according to claim 5, wherein
the object generation unit is configured to:
generate an arrow-shaped figure which is a three-dimensional image as the object; and
transform the arrow-shaped figure such that a thickness of a terminal end side of the arrow-shaped figure is greater than a thickness of a leading end side of the arrow-shaped figure when a downhill slope exists between the vehicle and the place.

9. The head-up display system according to claim 5, wherein
the object generation unit is configured to:
generate an arrow-shaped figure which is a three-dimensional image as the object; and
transform the arrow-shaped figure such that a thickness of a leading end side of the arrow-shaped figure is greater than a thickness of a terminal end side of the arrow-shaped figure when an uphill slope exists between the vehicle and the place.

10. A head-up display system comprising
a processor configured to:
generate an arrow-shaped figure as an object for supporting driving;
adjust at least one of a degree of blur of the arrow-shaped figure or a thickness of the arrow-shaped figure in such a manner as to adapt to a place at which driving support is required based on information on the place;
transform the object based on a direction of a second running axis that is assumed at the place when a first running axis extending along a running direction of a vehicle is different from the second running axis;
generate an arrow-shaped figure as the object;
transform the arrow-shaped figure when a distance between a position of the vehicle and an intersection is equal to or less than a predetermined distance, guidance on a right or left turn as driving support being required at the intersection; and
blur a contour of a leading end side of the arrow-shaped figure more than a contour of a terminal end side of the arrow-shaped figure when a downhill slope exists between the position of the vehicle and the intersection, and
display the object on a windshield, by using a projector, in such a manner that the object is superimposed on a real space visible across the windshield.

\* \* \* \* \*